United States Patent
Thompson et al.

(12)

(10) Patent No.: US 11,104,414 B2
(45) Date of Patent: Aug. 31, 2021

(54) ROTOR ASSEMBLY AND METHOD OF ASSEMBLING SAME

(71) Applicant: Bell Textron Inc., Fort Worth, TX (US)

(72) Inventors: George Matthew Thompson, Lewisville, TX (US); Jonathan Knoll, Burleson, TX (US); Paul Sherrill, Grapevine, TX (US)

(73) Assignee: Textron Innovations Inc., Providence, RI (US)

( * ) Notice: Subject to any disclaimer, the term of this patent is extended or adjusted under 35 U.S.C. 154(b) by 21 days.

(21) Appl. No.: 16/590,223

(22) Filed: Oct. 1, 2019

(65) Prior Publication Data

US 2021/0094673 A1    Apr. 1, 2021

(51) Int. Cl.
  *B63H 1/20*  (2006.01)
  *B64C 11/06* (2006.01)
  *B64C 11/30* (2006.01)
  *F01D 7/00*  (2006.01)

(52) U.S. Cl.
  CPC ............. *B64C 11/06* (2013.01); *B64C 11/30* (2013.01); *F01D 7/00* (2013.01)

(58) Field of Classification Search
  CPC ............. F16C 33/3806; F16C 33/3812; F16C 33/3818; F16C 33/41; F16C 33/412; F16C 33/418; F16C 33/7806; F16C 33/7893; F16C 2326/43; B64C 27/48
  See application file for complete search history.

(56) References Cited

U.S. PATENT DOCUMENTS

| | | | | | |
|---|---|---|---|---|---|
| 3,637,323 | A | * | 1/1972 | Chilman | B64C 11/30 |
| | | | | | 416/139 |
| 6,050,778 | A | * | 4/2000 | McArdle | B64C 27/32 |
| | | | | | 29/450 |
| 10,851,841 | B1 | * | 12/2020 | Thompson | F16C 19/163 |
| 2009/0097973 | A1 | * | 4/2009 | Cabrera | B64C 27/50 |
| | | | | | 416/1 |
| 2018/0327089 | A1 | * | 11/2018 | Shimek | B32B 5/26 |
| 2020/0001987 | A1 | * | 1/2020 | Choi | B64C 27/001 |
| 2020/0001988 | A1 | * | 1/2020 | Cravener | B64C 27/006 |

\* cited by examiner

*Primary Examiner* — John Kwon
(74) *Attorney, Agent, or Firm* — Lightfoot & Alford PLLC

(57) ABSTRACT

A rotor assembly has a rotor hub having a unitary structure. The rotor assembly further includes a unitary crosshead having a first upper tab and a first lower tab located vertically below the first upper tab. The first upper tab and the first lower tab define a slot therebetween to accept a first pin of the first rotor blade. A second upper tab and a second lower tab located vertically below the second upper tab define a slot therebetween to accept a second pin of the second rotor blade. A first recess is provided between the first lower tab and the second lower tab so that the crosshead comprises no material directly between at least a portion of the first lower tab and the second lower tab along at least one straight path.

19 Claims, 13 Drawing Sheets

ROTOR ASSEMBLY AND METHOD OF ASSEMBLING SAME

BACKGROUND

Rigid and semirigid rotor systems have rotor blades rigidly coupled to arms of a rotor hub while permitting feathering of the rotor blades about their respective pitch-change axes. Axial loads of the rotor blades are transferred to the rotor hub through thrust bearings positioned between the root ends of the rotor blades and the interior of the rotor hub. The thrust bearings must have larger diameters than the openings from which the rotor blades extend. For this reason, rigid and semirigid rotor hubs are often constructed by using a two piece clam-shell type rotor hub that is bolted together after the rotor blades and thrust bearings are installed and/or the rotor hub includes a ball port proximate each hub arm to facilitate the insertion of roller elements therein. However, the additional hardware and the additional material required to facilitate bolting the two pieces together increases the weight of the two-piece rotor hubs. And the inclusion of multiple ball ports through the rotor hub reduces the strength of the rotor hub, requiring yet more material, and may prevent an optimal load path through the rotor hub.

DETAILED DESCRIPTION

While the making and using of various embodiments of this disclosure are discussed in detail below, it should be appreciated that this disclosure provides many applicable inventive concepts, which can be embodied in a wide variety of specific contexts. The specific embodiments discussed herein are merely illustrative and do not limit the scope of this disclosure. In the interest of clarity, not all features of an actual implementation may be described in this disclosure. It will of course be appreciated that in the development of any such actual embodiment, numerous implementation-specific decisions must be made to achieve the developer's specific goals, such as compliance with system-related and business-related constraints, which will vary from one implementation to another.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure divulges a rotor assembly, and method for assembly thereof, that saves weight, improves load paths, and eliminates undesirable hardware. The rotor assembly includes a rotor hub with a unitary structure having a single centrally located access port for introducing the roller elements of a thrust bearing for each rotor blade. This is accomplished by designing the rotor hub assembly to allow the rotor blades to be inserted past their operating positions, allowing the roller elements to be inserted between an inner race coupled to the rotor blade and an outer race coupled to the rotor hub, and then withdrawing the rotor blades to their operating positions. The rotor assembly further includes a unitary crosshead that includes a plurality of recesses that allow the crosshead to be lowered onto a control tube without interference from the pitch control pins extending from the rotor blades.

Figure 1:
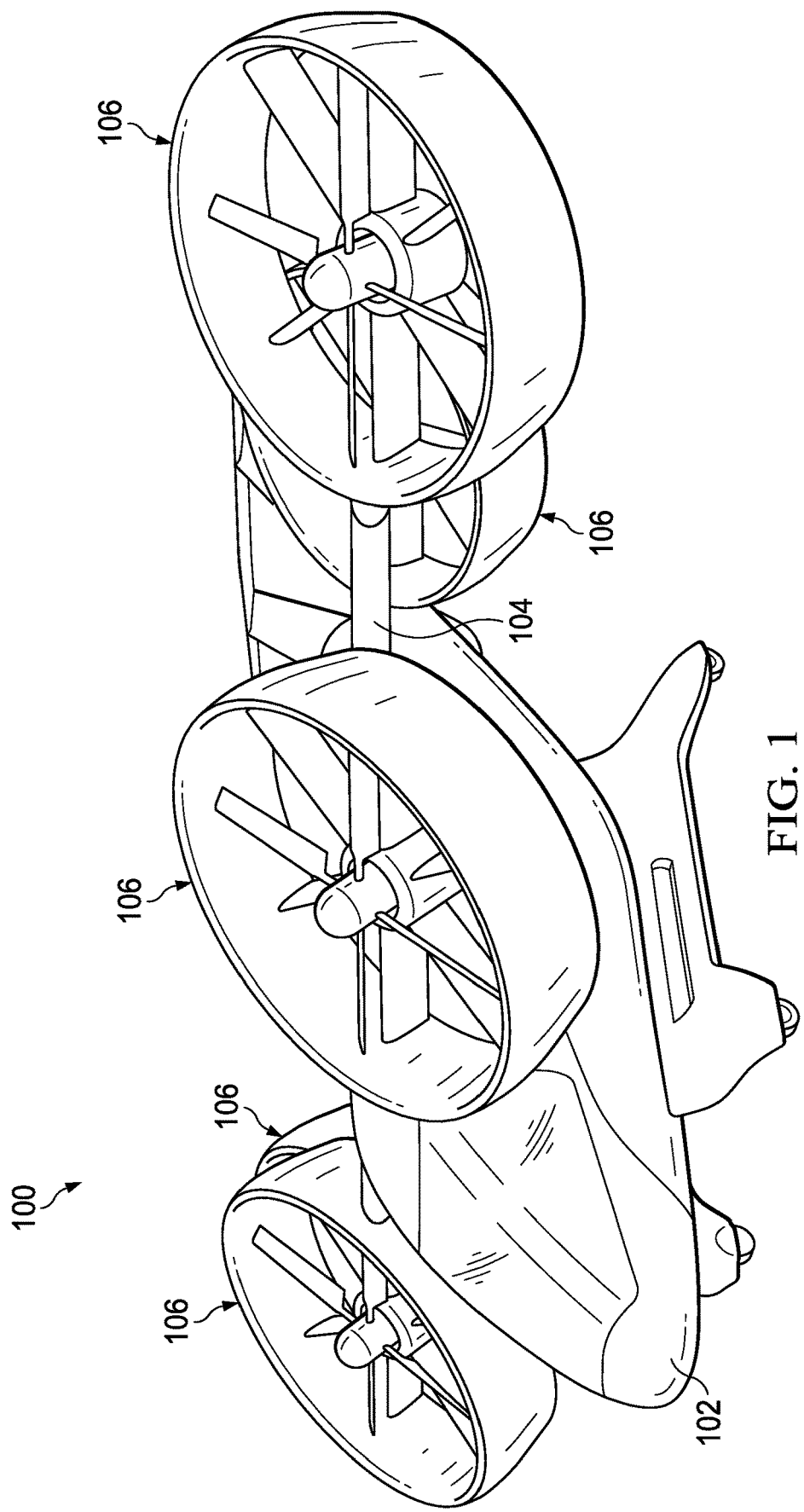
FIG. 1 is an oblique view of an aircraft including a rotor assembly, according to this disclosure.
Figure 2:
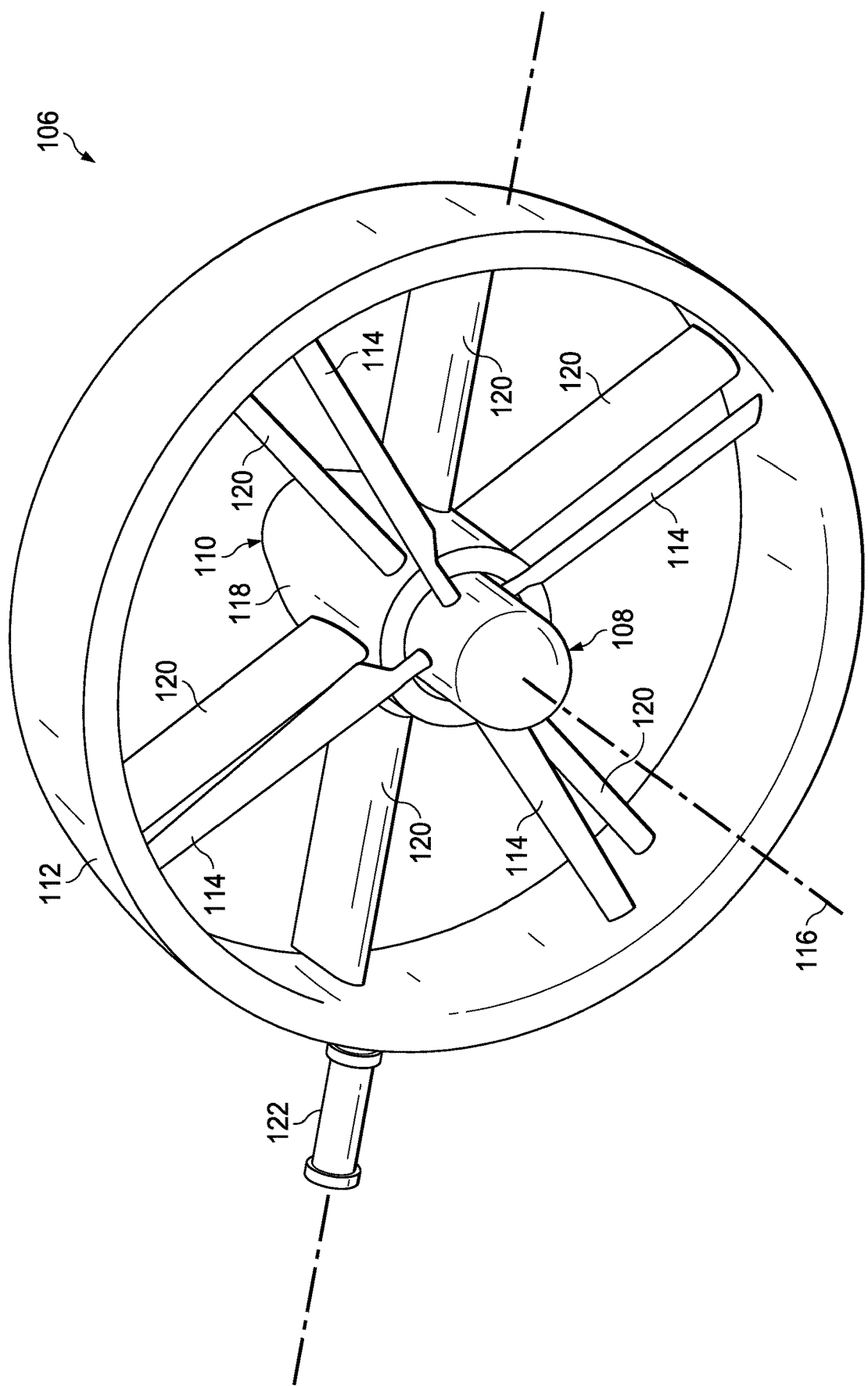
FIG. 2 is an oblique view of a ducted fan of the aircraft of FIG. 1.

FIG. 1 shows an aircraft 100 that is convertible between a helicopter mode, which allows for vertical takeoff and landing, hovering, and low speed directional movement, and an airplane mode, which allows for forward flight as well as horizontal takeoff and landing. Aircraft 100 includes a fuselage 102, a wing 104, and a plurality of ducted fans 106 rotatably coupled to fuselage 102 or wing 104. As best shown in FIG. 2, each ducted fan 106 includes a rotor assembly 108, a flow-straightening stator assembly 110, and a duct 112 surrounding rotor assembly 108 and stator assembly 110. Rotor assembly 108 includes a plurality of rotor blades 114 configured to rotate about a mast axis 116. Rotation of rotor blades 114 about mast axis 116 generates lift while operating in helicopter mode and thrust while operating in airplane mode. Stator assembly 110 is positioned downstream of rotor blades 114 and includes a stator hub 118 centrally located within duct 112 and a plurality of stator vanes 120 coupled between duct 112 and stator hub 118. Stator hub 118 may house an electric motor therein configured to produce rotational energy that drives the rotation of rotor assembly 108. Alternatively, stator hub 118 may house a gearbox therein that drives the rotation of rotor assembly 108. Wherein the gearbox receives rotational energy from a driveshaft passing through an attachment post 122 and the adjacent stator vane 120.

Figure 3:
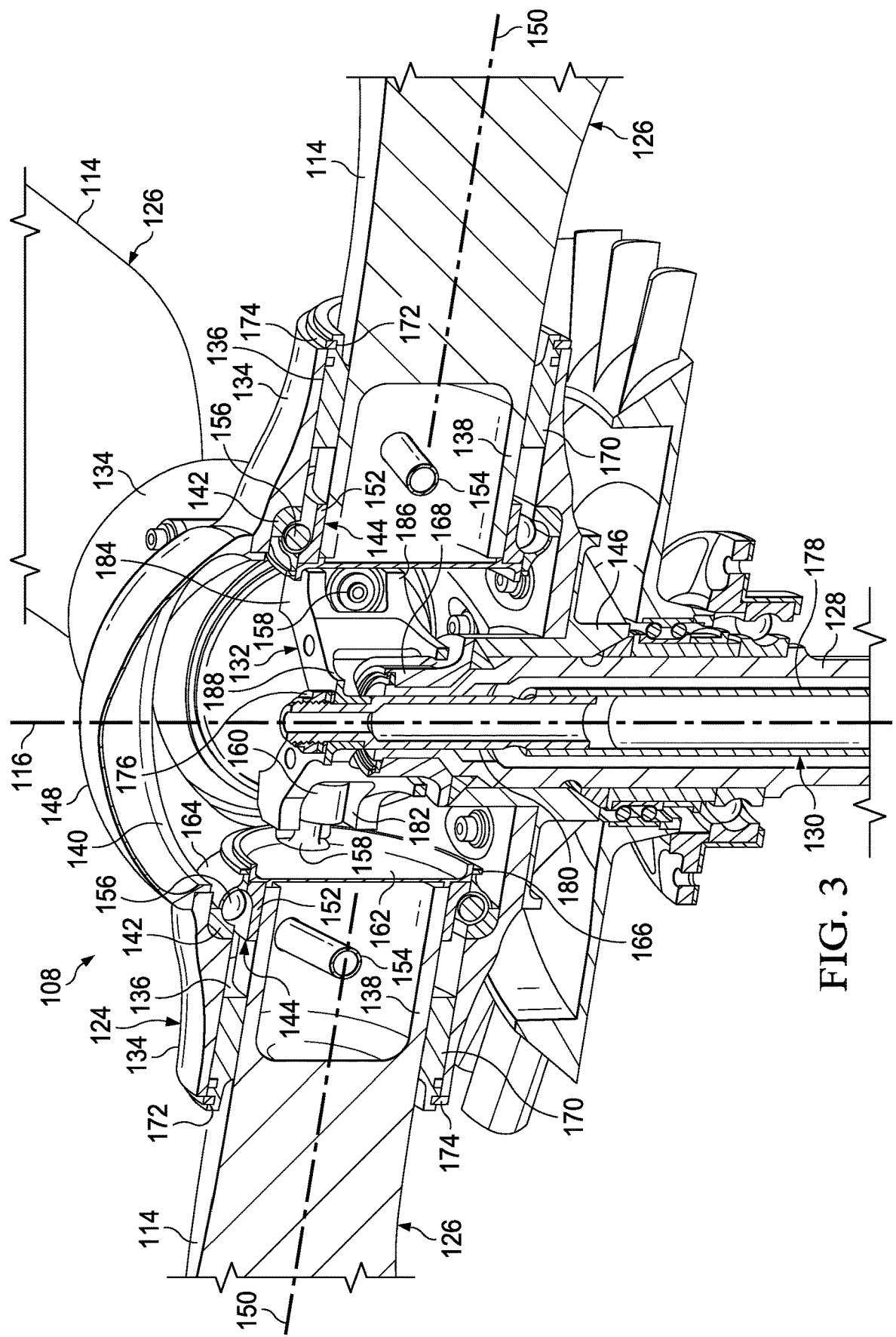
FIG. 3 is an oblique cross-sectional view of a rotor assembly, according to this disclosure.
Figure 4:
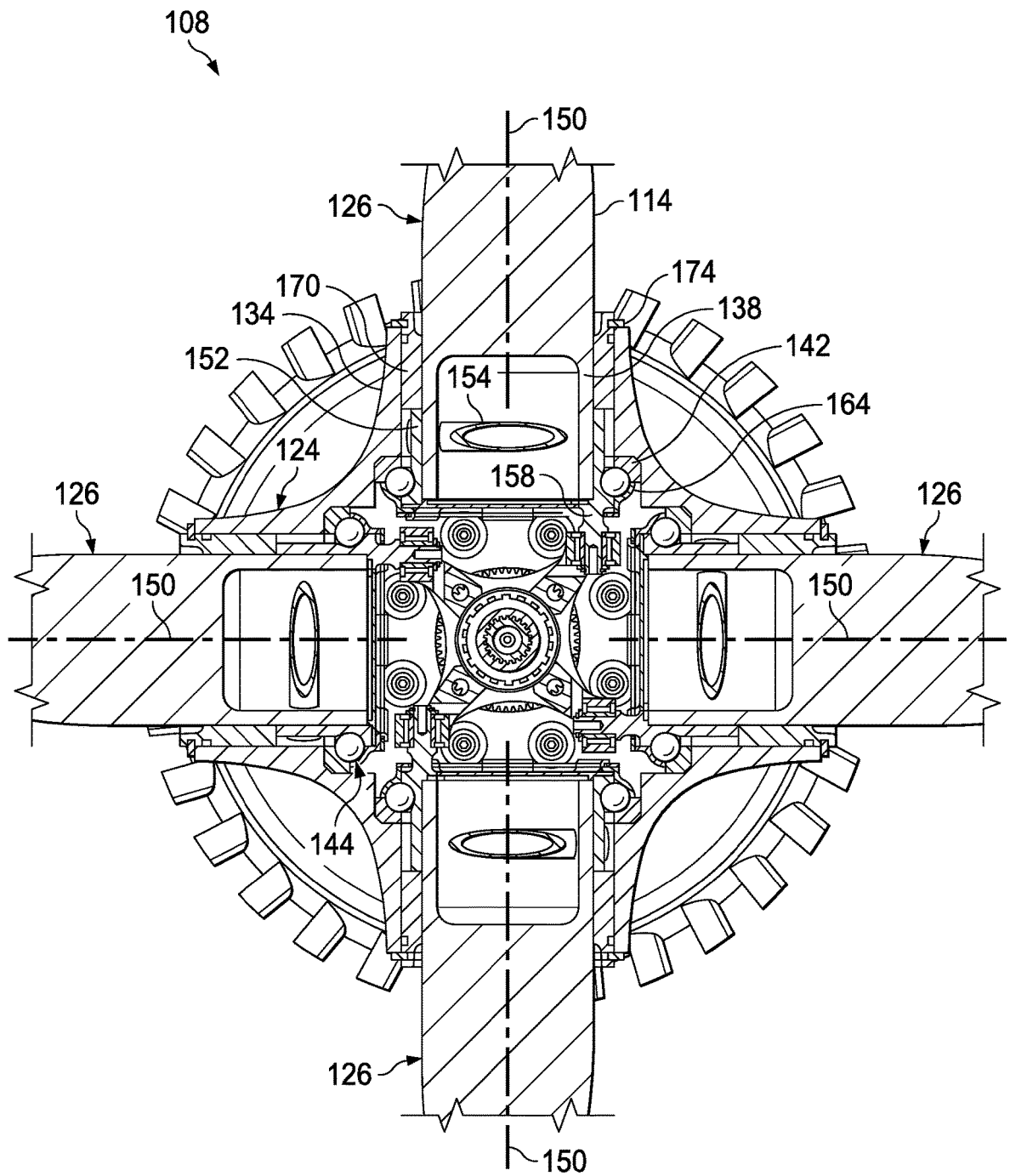
FIG. 4 is a cross-sectional top view of the rotor assembly of FIG. 3.

Referring now to FIGS. 3 and 4, the components of rotor assembly 108 are described below. Rotor assembly 108 includes a rotor hub 124, a plurality of rotor blade assemblies 126 coupled to rotor hub 124, a rotor mast 128, a control tube 130, and a crosshead 132. Rotor hub 124 is formed of a unitary structure that includes a plurality of hub arms 134. Each hub arm 134 includes a rotor blade opening 136 configured to receive a blade root 138 of one of rotor blades 114 therein. Rotor hub 124 further includes a single access port 140, centrally located relative to hub arms 134, that enables access to blade roots 138 of rotor blades 114. Each hub arm 134 also includes an outer race 142 of a thrust bearing 144 coupled thereto at the innermost end of rotor blade opening 136. While outer races 142 are shown as a separate component coupled to the unitary structure, outer races 142 may also be integral with the unitary structure of rotor hub 124. Rotor hub 124 may be directly coupled to rotor mast 128 for common rotation therewith about mast axis 116. Alternatively, rotor hub 124 may be coupled to rotor mast 128 via a mast adapter 146. Rotor hub 124 further includes a fairing 148 coupled thereto which covers access port 140 during operation of rotor assembly 108.

Figure 5:
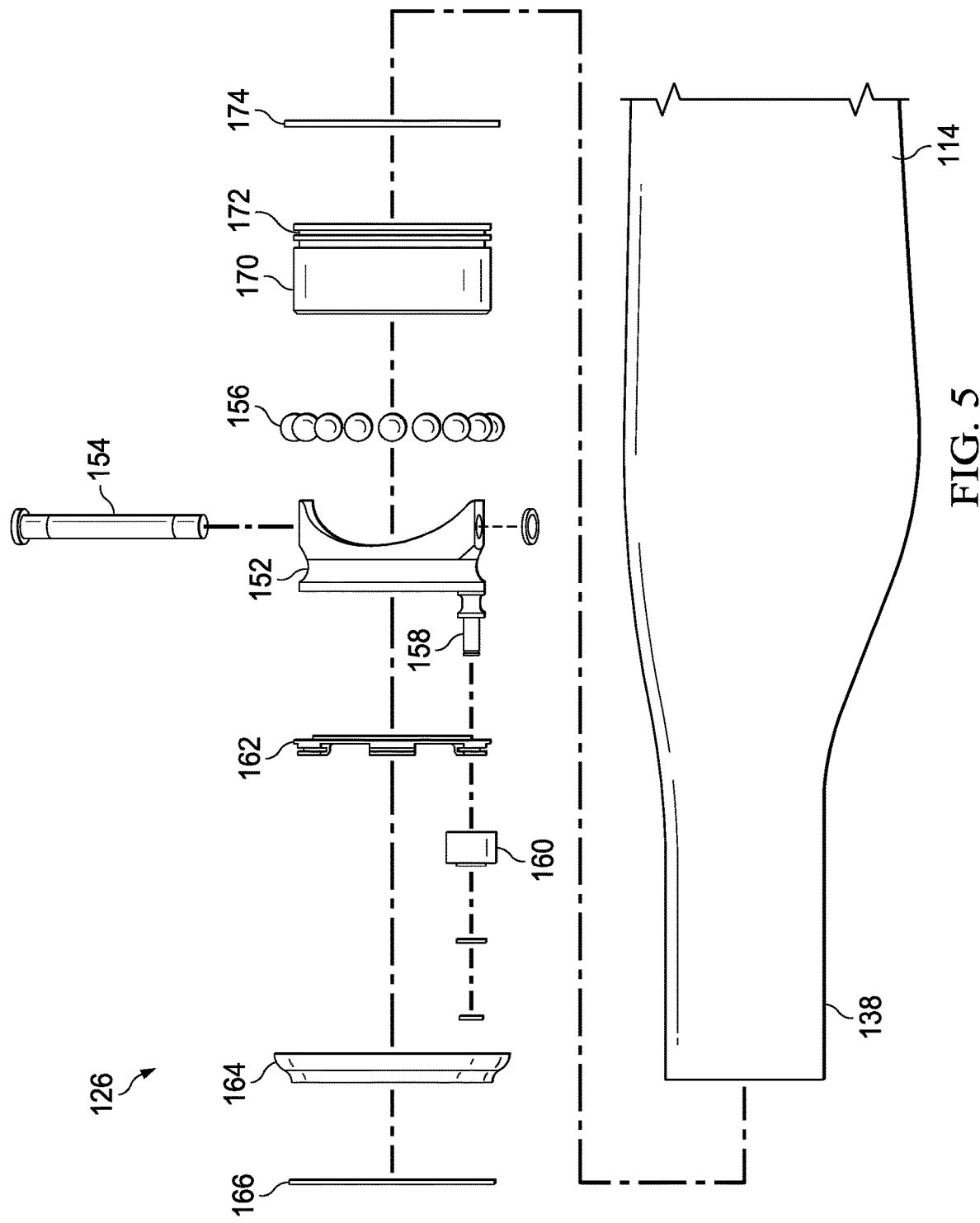
FIG. 5 is an exploded side view of a rotor blade assembly of the rotor assembly of FIG. 3.

The components of rotor blade assemblies 126 are illustrated in FIGS. 3-5. Each rotor blade assembly 126 includes one rotor blade 114 with its blade root 138 disposed within one of hub arms 134 and being rotatable relative thereto about a pitch-change axis 150. An inner race 152 of thrust bearing 144 encircles each blade root 138 and is coupled thereto via a fastener 154. Each rotor assembly 126 further includes a plurality of roller elements 156 of thrust bearing 144 positioned around the circumference of inner race 152 and disposed between inner race 152 and outer race 142. Roller elements 156 carry the axial loads along pitch-change axis 150 while enabling rotor blade 114 to rotate about pitch-change axis 150. While roller elements 156 are shown as spherical, it should be understood that they may be cylindrical, tapered, needle, or any other suitable shape. Each rotor blade assembly 126 also includes a pin 158 extending from blade root 138 configured to impart rotation of rotor blade 114 about pitch-change axis 150 in response to translation of crosshead 132 along mast axis 116. Pin 158 may be coupled to inner race 152, coupled directly to blade root 138, or, as shown, pin 158 may be unitarily formed with inner race 152. Furthermore, pin 158 may include a roller bearing 160 coupled thereto to permit translation of pin 158 relative to crosshead 132. An endcap 162 is coupled to the innermost end of rotor blade 114 and/or inner race 152 and a roller element retainer 164 is coupled to endcap 162 via a retaining ring 166. While shown as a separate component, it should be understood that endcap 162 may be unitarily formed with inner race 152. A roller or journal bearing 170 is coupled to each rotor blade 114 adjacent to inner race 152 to react sheer loads between rotor blade 114 and hub arm 134. Journal bearing 170 includes a groove 172 that receives a rotor blade retainer 174 therein to resist inward movement of rotor blade assembly 126 after the assembly of rotor assembly 108 is complete.

Referring now to FIG. 3, control tube 130 extends coaxially through rotor mast 128 and is coupled thereto for common rotation therewith about mast axis 116, but control tube 130 is translatable relative to rotor mast 128 along mast axis 116. Mast adapter 146 is coupled to rotor mast 128 via a mast nut 168. Crosshead 132 is coupled to control tube 130 via a nut 176. Control tube 130 comprises a lower tube 178 coupled to an upper tube 180, wherein upper tube 180 has a smaller outer diameter than lower tube 178. This configuration may allow for lower tube 178 to be preinstalled within rotor mast 128 prior to installation of rotor assemblies 126, giving the installer more room to operate within rotor hub 124 while installing rotor blade assemblies 126, and then inserting upper tube 180 and crosshead 132 after the installation of rotor assemblies 126. Lower tube 178 is coupled to an actuator configured to impart translational motion thereto along mast axis 116 and upper tube 180 is coupled to crosshead 132. While control tube 130 is shown as a two piece structure, it should be understood that control tube 130 may comprise a unitary structure.

Crosshead 132 comprises a unitary structure and includes a plurality of slots 182, each being defined by an upper tab 184 and a lower tab 186. Each slot 182 is configured to receive one pin 158 therein, such that upwards translation of control tube 130 along mast axis 116 causes lower tabs 186 to push pins 158 upwards, through roller bearings 160, causing rotation of rotor blades 114 about pitch-change axes 150 in a first direction and downwards translation of control tube 130 along mast axis 116 causes upper tabs 184 to push pins 158 downwards, through roller bearings 160, causing rotation of rotor blades 114 about pitch-change axes 150 in an opposite second direction. Adjacent to each slot 182 is a recess 188 configured to permit installation of crosshead 132 along mast axis 116 without contacting pins 158.

The method of assembling rotor assembly 108 is described with reference primarily to FIGS. 3-10. Rotor hub 124 is coupled to mast adapter 146 and then lowered along mast axis 116 into splined engagement with rotor mast 128 and then mast adapter 146 is coupled to rotor mast 128 with mast nut 168. Journal bearing 170 is slipped over blade root 138 and coupled thereto. Inner race 152 of thrust bearing 144 is then slipped over blade root 138 adjacent to journal bearing 170 and then fastener 154 is inserted therethrough to couple inner race 152 to rotor blade 114. Endcap 162 is then coupled to inner race 152 and/or blade root 138 and roller bearing 160 is mounted on pin 158. Blade root 138 is then inserted along pitch-change axis 150 into rotor blade opening 136 of hub arm 134 past an operating position to a bearing installation position, as shown by rotor blade assembly 126a in FIG. 6. In the bearing installation position, blade root 138 is accessible through access port 140 of rotor hub 124. Roller element retainer 164 is then placed on inner race 152 and coupled thereto by installing retaining ring 166 on endcap 162. It should be noted that the outer diameter of inner race 152 is limited by the inner diameter of rotor hub opening 136. However, it may be possible to install inner race 152 on blade root 138 after blade root 138 is inserted through hub arm 134. Which would enable inner race 152 to have a larger outer diameter and eliminate the need for roller element retainer 164. Either way, plurality of roller elements 156 are then introduced through access port 140 of rotor hub 124 and positioned around a circumference of inner race 152. With roller elements 152 in place, rotor blade assembly 126 is withdrawn along pitch-change axis 150 to the operating position. With rotor blade assembly 126 in the operating position, rotor blade retainer 174 is inserted into groove 172 of journal bearing 170, thereby retaining rotor blade assembly 126 in the operating position. This procedure is then repeated for each of rotor blade assemblies 126.

Figure 6:
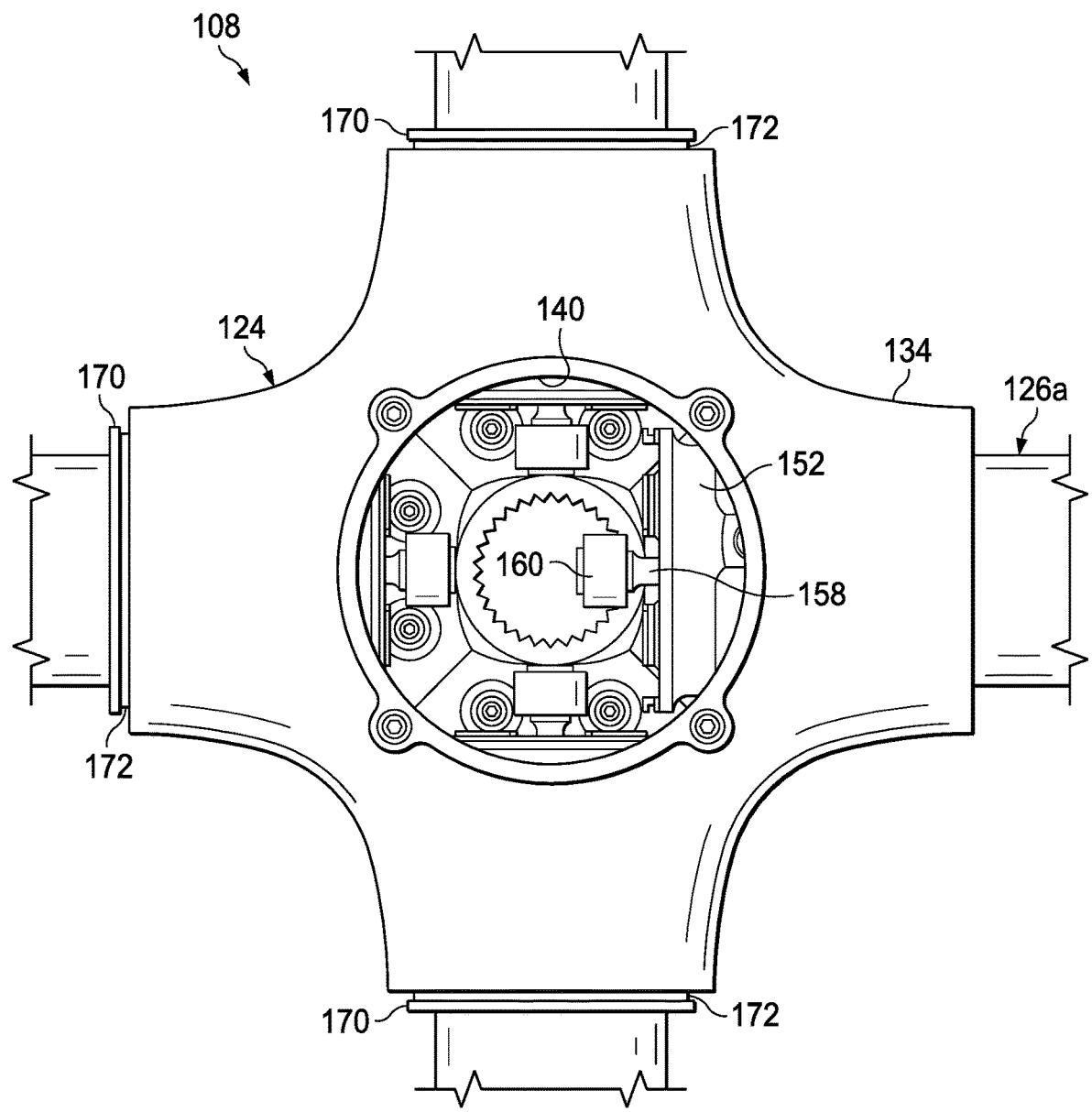
FIG. 6 is a top view of the rotor assembly of FIG. 3, showing a rotor blade positioned for the insertion of roller elements.
Figure 7:
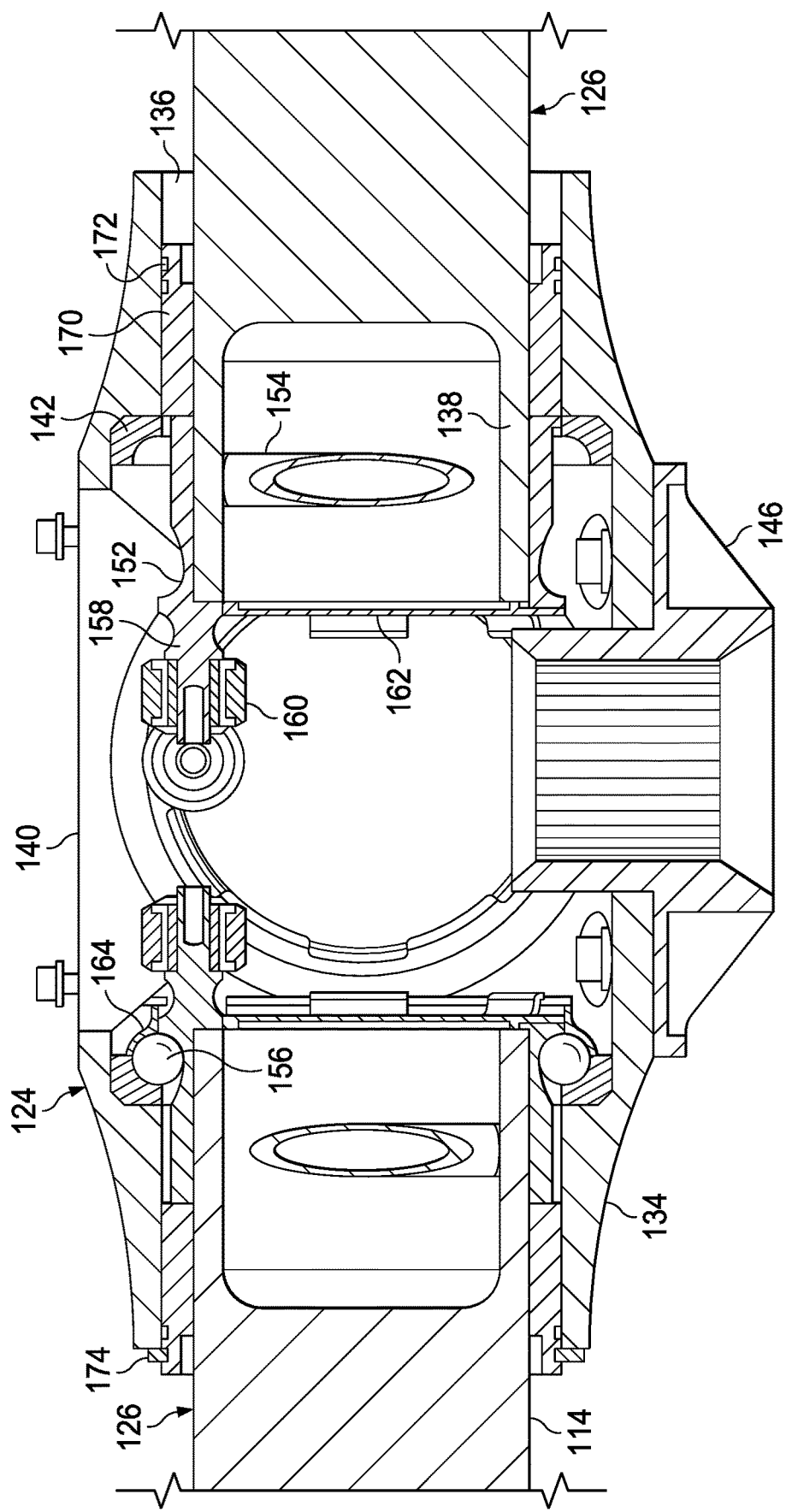
FIG. 7 is a cross-sectional side view of the rotor assembly of FIG. 6.
Figure 8:
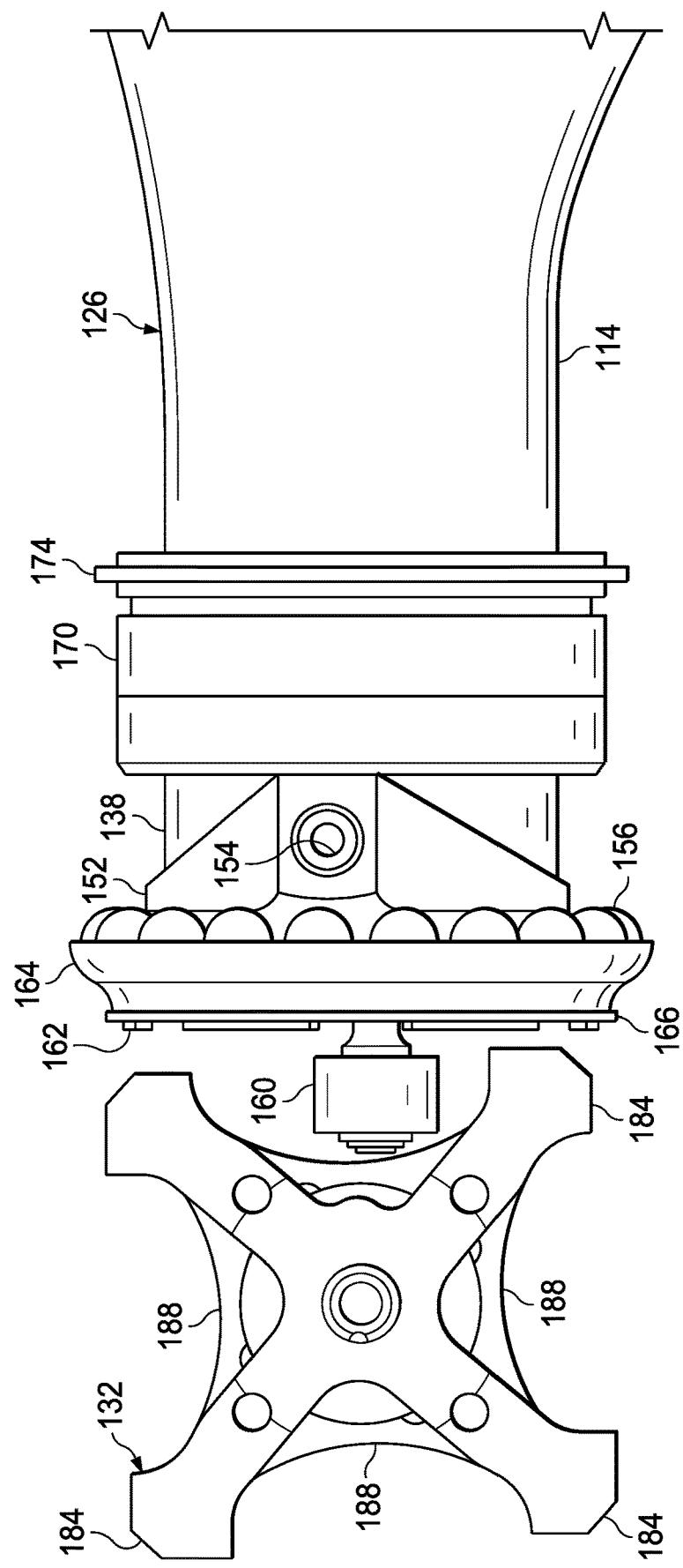
FIG. 8 is a top view of the rotor blade assembly and a crosshead of the rotor assembly of FIG. 3 in a disengaged relationship.
Figure 9:
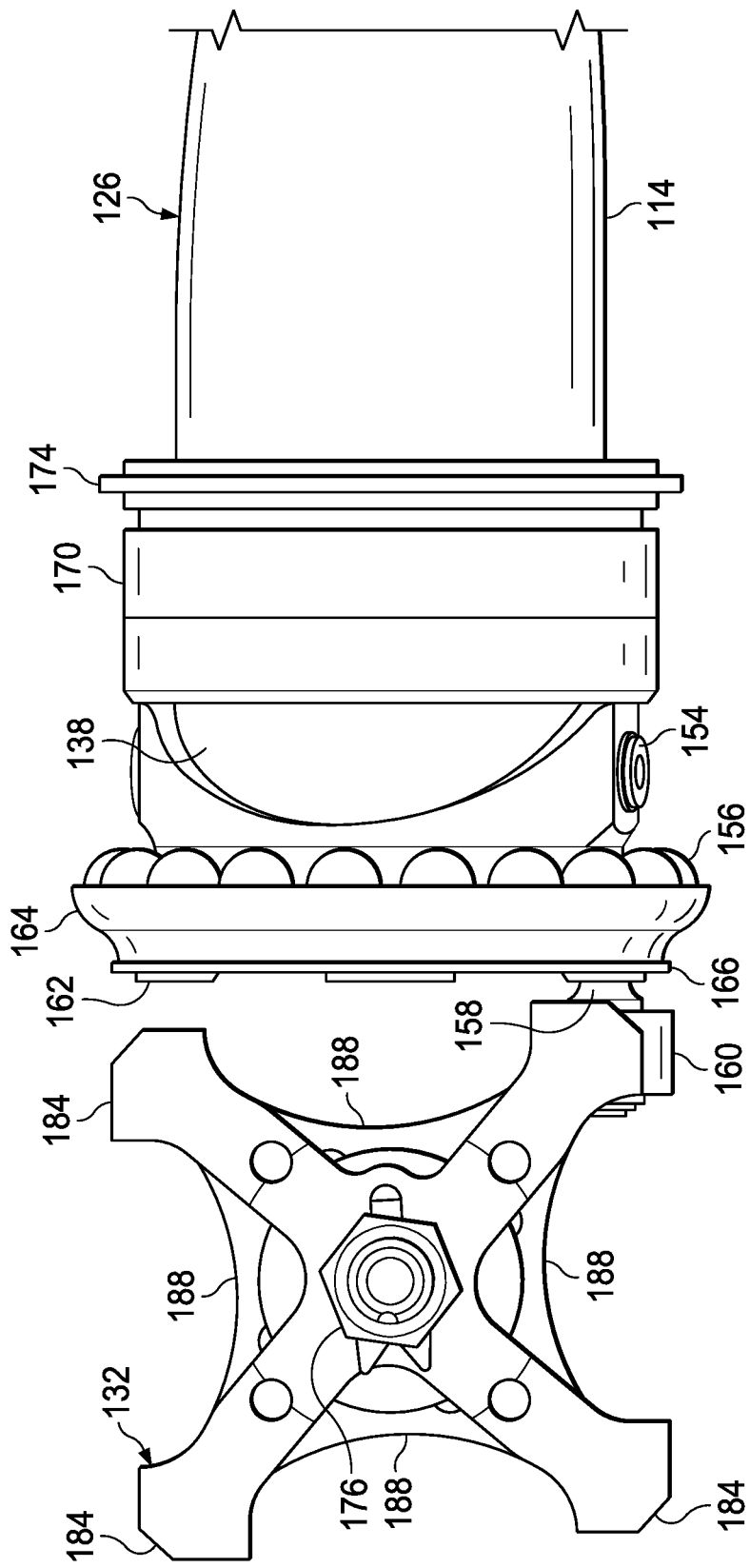
FIG. 9 is a top view of the rotor blade assembly and a crosshead of the rotor assembly of FIG. 3 in an engaged relationship.
Figure 10:
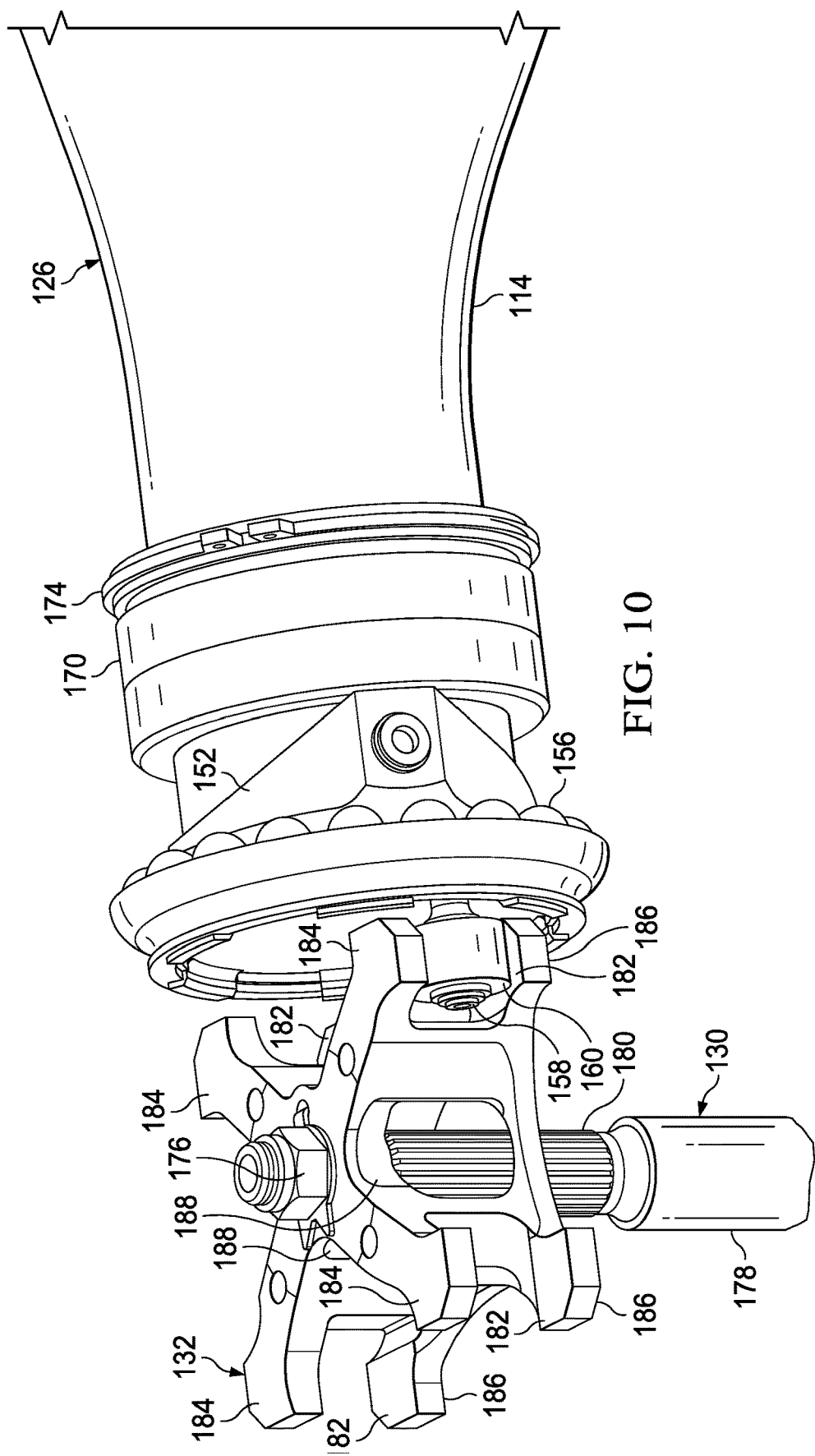
FIG. 10 is an oblique view of the rotor blade assembly and crosshead of FIG. 9.

Control tube 130 is then inserted through rotor mast 128. Control tube 130 may be inserted from bottom of rotor mast 128, or alternatively, lower tube 178 may be inserted from the bottom of rotor mast 128 and upper tube 180 may be inserted through the top of rotor mast 128. Each of rotor blade assemblies 126 is then rotated about its pitch-change axis 150 to a crosshead installation orientation, as shown in FIGS. 6-8. In the crosshead installation orientation, pins 158 are located above pitch-change axes 150. This may place pins 158 at their highest vertical orientation, or offset therefrom, depending on the shapes of recesses 188. With rotor blade assemblies 126 in the crosshead installation orientation, crosshead 132 is inserted through access port 140 and is lowered onto control tube 130 to a pin engagement position above an operating position, shown in FIG. 8. While control tube 130 is in the pin engagement position, rotor blade assemblies 126 are rotated about their pitch-change axes 150 until pins 158 are positioned within slots 182. After pins 158 are positioned within slots 182, crosshead 132 is lowered further down control tube 130 to an operating position where crosshead 132 is in splined engagement with control tube 130. Lowering crosshead 132 into operating position will cause rotor blade assemblies 126 to rotate about their respective pitch-change axes 150 into their operating orientations. Crosshead 132 is then coupled to control tube 130 with a nut 176. Finally, fairing 148 is coupled to rotor hub 124 to cover access port 140. Unless expressly stated otherwise, the aforementioned steps may be performed in any order.

Figure 11:
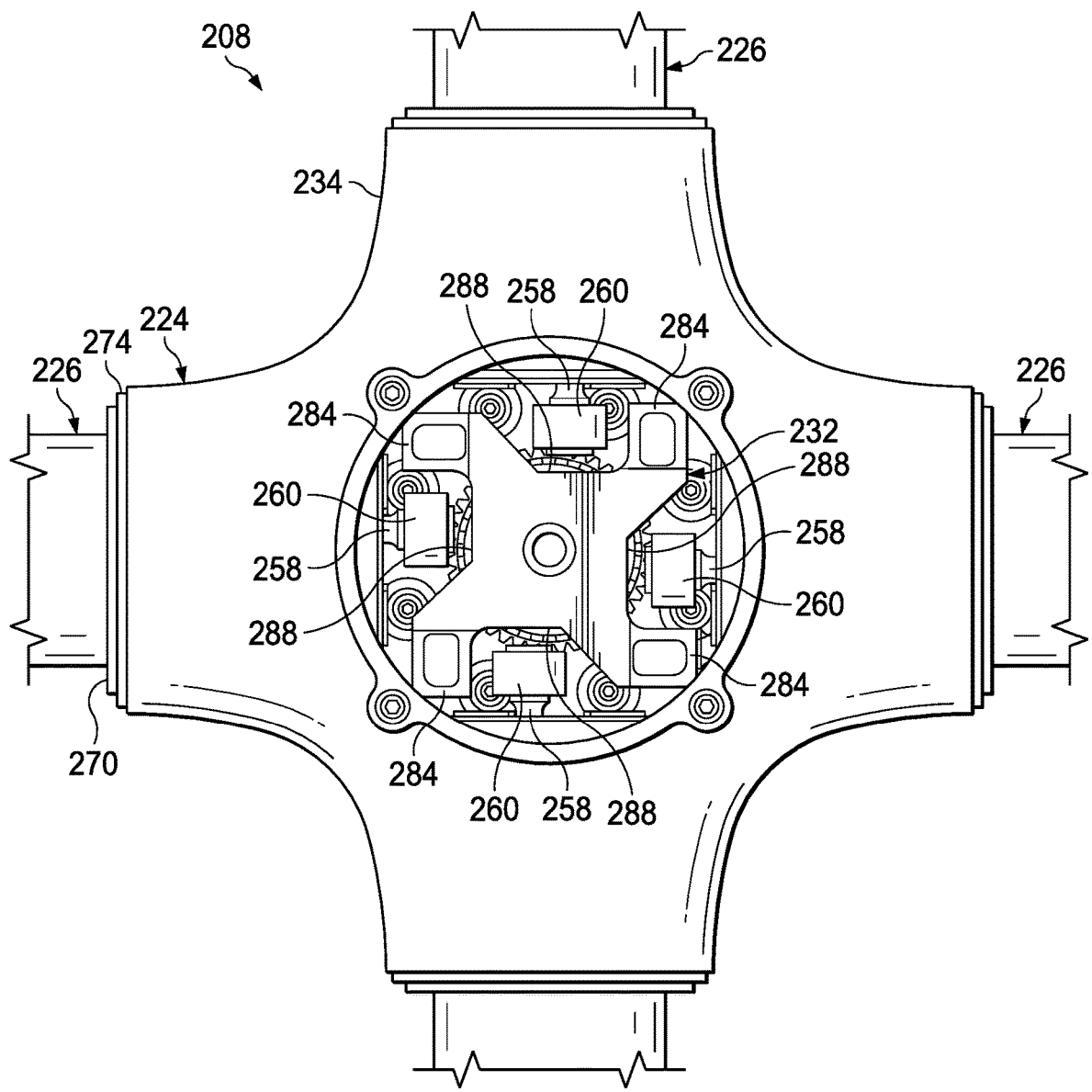
FIG. 11 is a top view of another rotor assembly, according to this disclosure, showing rotor blade assemblies in disengaged relationships with a crosshead.
Figure 12:
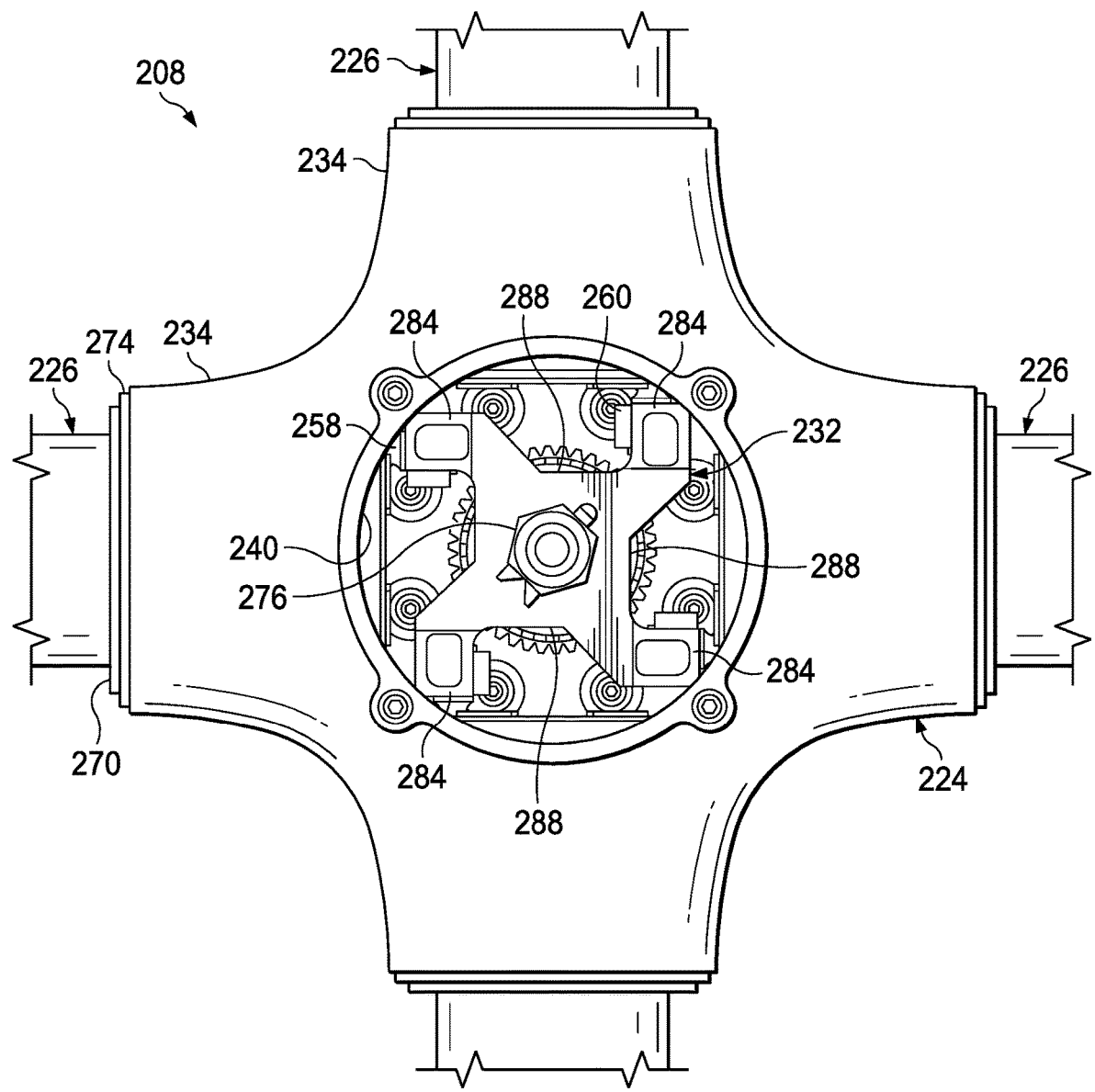
FIG. 12 is a top view of the rotor assembly of FIG. 11 showing the rotor blade assemblies in engaged relationships with the crosshead.
Figure 13:
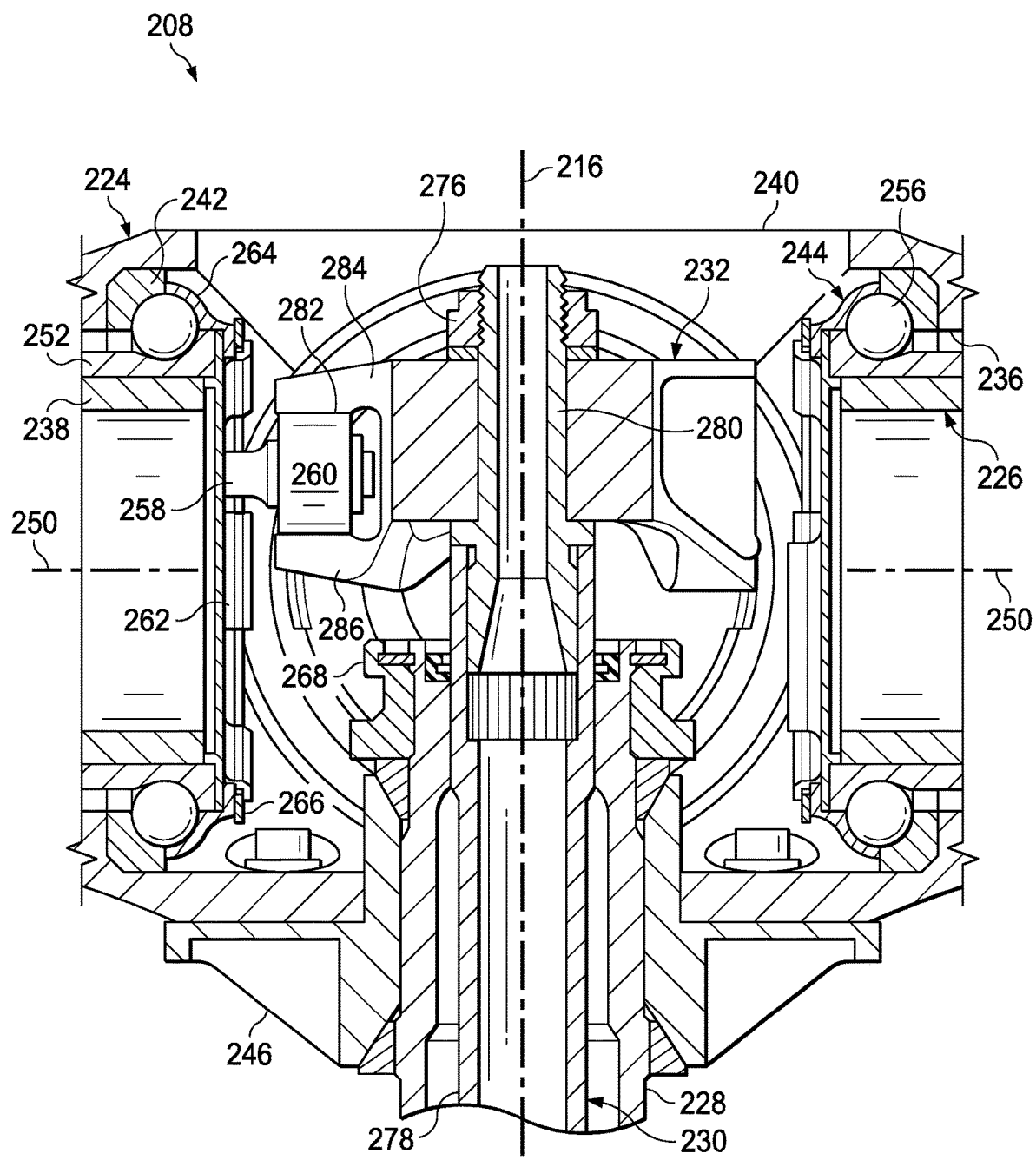
FIG. 13 is a cross-sectional side view of the rotor assembly of FIG. 11.

FIGS. 11-13 show another rotor assembly 208, having a similar structure and method of assembly thereof. Rotor assembly 208 includes a rotor hub 224, a plurality of rotor blade assemblies 226 coupled to rotor hub 224, a rotor mast 228, a control tube 230, and a crosshead 232. Rotor hub 224 is formed of a unitary structure that includes a plurality of hub arms 234. Each hub arm 234 includes a rotor blade opening 236 configured to receive a blade root 238 of one of rotor blades 214 therein. Rotor hub 224 further includes a single access port 240, centrally located relative to hub arms 234, that permits access to blade roots 238 of rotor blades 214. Each hub arm 234 also includes an outer race 242 of a thrust bearing 244 coupled thereto at the innermost end of rotor blade opening 236. While outer races 242 are shown as a separate component coupled to the unitary structure, outer races 242 may also be integral with the unitary structure. Rotor hub 224 may be directly coupled to rotor mast 228 for common rotation therewith about mast axis 216. Alternatively, rotor hub 224 may be coupled to rotor mast 228 via a mast adapter 246. Rotor hub 224 further includes a fairing coupled thereto which covers access port 240 during operation of rotor assembly 208.

Each rotor blade assembly 226 includes one rotor blade 214 with its blade root 238 disposed within one of hub arms 234 and being rotatable relative thereto about a pitch-change axis 250. An inner race 252 of thrust bearing 244 encircles each blade root 238 and is coupled thereto via a fastener. Each rotor assembly 226 further includes a plurality of roller elements 256 of thrust bearing 244 positioned around the circumference of inner race 252 and disposed between inner race 252 and outer race 242. Roller elements 256 carry the axial loads along pitch-change axis 250 while enabling rotor blade 214 to rotate about pitch-change axis 250. While roller elements 256 are shown as spherical, it should be understood that they may be cylindrical, tapered, needle, or any other suitable shape. Each rotor blade assembly 226 also includes a pin 258 extending from blade root 238 configured to impart rotation of rotor blade 214 about pitch-change axis 250 in response to translation of crosshead 232 along mast axis 216. Pin 258 may be coupled to inner race 252, coupled directly to blade root 238, or, as shown, pin 258 may be unitarily formed with inner race 252. Furthermore, pin 258 may include a roller bearing 260 coupled thereto to permit translation of pin 258 relative to crosshead 232. An endcap 262 is coupled to the innermost end of rotor blade 214 and/or inner race 252 and a roller element retainer 264 is coupled to endcap 262 via a retaining ring 266. A roller or journal bearing 270 is coupled to each rotor blade 214 adjacent to inner race 252 to react sheer loads between rotor blade 214 and hub arm 234. Journal bearing 270 includes a groove that receives a rotor blade retainer 274 therein to resist inward movement of rotor blade assembly 226.

Control tube 230 extends coaxially through rotor mast 228 and is coupled thereto for common rotation therewith about mast axis 216, but control tube 230 is translatable relative to rotor mast 228 along mast axis 216. Mast adapter 246 is coupled to rotor mast 228 via a mast nut 268. Crosshead 232 is coupled to control tube 230 via a nut 276. Similar to control tube 130, control tube 230 comprises a lower tube 278 coupled to an upper tube 280. However, contrary to control tube 130, lower tube 278 extends all the way through rotor mast 228 and may be inserted into rotor mast 228 from the top, through access port 240. Lower tube 278 is coupled to an actuator configured to impart translational motion thereto along mast axis 216 and upper tube 280 is coupled to crosshead 232.

Crosshead 232 comprises a unitary structure and includes a plurality of slots 282, each being defined by an upper tab 284 and a lower tab 286. Each slot 282 is configured to receive one pin 258 therein, such that upwards translation of control tube 230 along mast axis 216 causes lower tabs 286 to push pins 258 upwards, through roller bearings 260, causing rotation of rotor blades 214 about pitch-change axes 250 in a first direction and downwards translation of control tube 230 along mast axis 216 causes upper tabs 284 to push pins 258 downwards, through roller bearings 260, causing rotation of rotor blades 214 about pitch-change axes 250 in an opposite second direction. Adjacent to each slot 282 is a recess 288 configured to permit installation of crosshead 232 along mast axis 216 without contacting pins 258. Contrary to recess 188, recesses 288 of crosshead 232 are off-center, and therefore, the crosshead installation orientation of rotor blade assemblies 226 is corresponding skewed.

The components of rotor assemblies 108 and 208 may comprise any materials suitable for use with an aircraft rotor. For example, rotor blades 114 and 214 and rotor hubs 124 and 224 may comprise carbon fiber or aluminum; and rotor masts 128 and 228, control tubes 130 and 230, rotor hubs 124 and 224, outer races 142 and 242, inner races 152 and 252, mast nuts 168 and 268, mast adapters 146 and 246 may comprise steel or titanium. While rotor hub assemblies 108 and 208 are shown with four rotor blades 114 and 214, respectively, it should be understood that they may have as few as two rotor blades and may have more than four rotor blades.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, RI, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A rotor assembly, comprising:
a rotor hub comprising a unitary structure, the rotor hub including a first hub arm and a second hub arm, the first hub arm including a first rotor blade opening configured to receive a blade root of a first rotor blade therein and an outer race of a first thrust bearing located at an innermost end of the first rotor blade opening, the second hub arm including a second rotor blade opening configured to receive a blade root of a second rotor blade therein and including an outer race of a second thrust bearing located at the innermost end of the second rotor blade opening, the rotor hub further including a central access port located between the first and second hub arms, the access port being configured to permit the insertion of roller elements for both the first and second thrust bearings therethrough; and
a unitary crosshead, comprising:
  a first upper tab and a first lower tab located vertically below the first upper tab, the first upper tab and the first lower tab defining a slot therebetween to accept a first pin of the first rotor blade; and
  a second upper tab and a second lower tab located vertically below the second upper tab, the second upper tab and the second lower tab defining a slot therebetween to accept a second pin of the second rotor blade;
  wherein a first recess is provided between the first lower tab and the second lower tab so that the crosshead comprises no material directly between at least a portion of the first lower tab and the second lower tab along at least one straight path.

2. The rotor assembly of claim 1, further comprising:
a rotor mast coupled to the rotor hub for common rotation therewith about a mast axis;
a first rotor blade extending from the first hub arm, the first rotor blade including a blade root disposed within the first hub arm, wherein the first rotor blade is rotatable about a first pitch-change axis;
an inner race of the first thrust bearing coupled to the blade root of the first rotor blade;
a second rotor blade extending from the second hub arm, the second rotor blade having a blade root disposed within the second hub arm, wherein the second rotor blade is rotatable about a second pitch-change axis;
an inner race of the second thrust bearing coupled to the blade root of the second rotor blade;
a first plurality of roller elements disposed between the inner race and the outer race of the first thrust bearing; and
a second plurality of roller elements disposed between the inner race and the outer race of the second thrust bearing.

3. The rotor assembly of claim 2, further comprising:
a control tube extending through, and being translatable relative to, the rotor mast;
wherein the crosshead is coupled to the control tube; and
wherein translation of the control tube relative to the rotor mast causes rotation of the first rotor blade and the second rotor blade about the first pitch-change axis and the second pitch-change axis, respectively.

4. The rotor assembly of claim 1, wherein the crosshead further comprises a second recess provided between the first upper tab and the second upper tab so that the crosshead comprises no material directly between at least a portion of the first upper tab and the second upper tab along at least one straight path.

5. The rotor assembly of claim 1, wherein the crosshead further comprises:
four upper tabs;
four lower tabs;
recesses between all adjacent upper tabs; and
recesses between all adjacent lower tabs.

6. The rotor assembly of claim 5, further comprising:
a mast adapter, wherein the mast adapter couples the rotor hub to the rotor mast for common rotation therewith.

7. A rotor assembly, comprising:
a unitary rotor hub including a first hub arm and a second hub arm, each of the first and second hub arms having a rotor blade opening with an uninterrupted perimeter configured to receive a blade root of a rotor blade therein, the first hub arm including an outer race of a first thrust bearing located at the innermost end of rotor blade opening and the second hub arm including an outer race of a second thrust bearing located at the innermost end of the rotor blade opening, the rotor hub further having an access port located between the first and second hub arms, the access port being configured to permit the insertion of blade bearings therethrough to each of the first and second hub arms; and
a unitary crosshead, comprising:
  a first upper tab and a first lower tab located vertically below the first upper tab, the first upper tab and the first lower tab defining a slot therebetween to accept a first pin of a first rotor blade; and
  a second upper tab and a second lower tab located vertically below the second upper tab, the second upper tab and the second lower tab defining a slot therebetween to accept a second pin of a second rotor blade;
  wherein a first recess is provided between the first lower tab and the second lower tab so that the crosshead comprises no material directly between at least a portion of the first lower tab and the second lower tab along at least one straight path.

8. The rotor assembly of claim 7, further comprising:
a first rotor blade assembly disposed within the rotor blade opening of the first hub arm and being configured to rotate about a first pitch-change axis, the first rotor blade assembly comprising:

the first rotor blade;
the inner race of the first thrust bearing encircling a root of the first rotor blade; and
a plurality of roller elements disposed between the inner race and the outer race of the first thrust bearing, the first pin extending from the inner race of the first thrust bearing; and
a second rotor blade assembly disposed within the rotor blade opening of the second hub arm and being configured to rotate about a second pitch-change axis, the second rotor blade assembly comprising:
the second rotor blade;
the inner race of the second thrust bearing encircling a root of the second rotor blade; and
a plurality of roller elements disposed between the inner race and the outer race of the second thrust bearing, the second pin extending from the inner race of the second thrust bearing.

9. The rotor assembly of claim 8, further comprising:
a rotor mast coupled to the rotor hub for common rotation therewith about a mast axis;
a control tube extending through, and being translatable relative to, the rotor mast; and
wherein translation of the control tube relative to the rotor mast causes rotation of the first and second rotor blade assemblies about the first pitch-change axis and the second pitch-change axis, respectively.

10. The rotor assembly of claim 7, wherein the first recess permits installation of the crosshead along the mast axis without contacting the pin of the first rotor blade.

11. The rotor assembly of claim 10, wherein each of the first and second blade assemblies further comprise:
a roller element retainer coupled to the inner race; and
a roller bearing coupled to the pin, the roller bearing being configured to permit the pin to translate relative to the respective slot of the crosshead.

12. The rotor assembly of claim 11, wherein each of the first and second blade assemblies further comprise:
a journal bearing adjacent to the inner race.

13. A method of assembling a rotor assembly, comprising:
inserting a first rotor blade into a first hub arm of a unitary rotor hub past an operating position to a bearing installation position;
introducing a first plurality of roller elements through an access port in the rotor hub;
positioning the first plurality of roller elements around a circumference of an inner race of a first thrust bearing on a root of the first rotor blade;
withdrawing the first rotor blade to the operating position;
inserting a second rotor blade into a second hub arm of the rotor hub past an operating position to a bearing installation position;
introducing a second plurality of roller elements through the access port in the rotor hub;
positioning the second plurality of roller elements around a circumference of an inner race of a second thrust bearing on a root of the second rotor blade;
withdrawing the second rotor blade to the operating position;
coupling the rotor hub to a rotor mast;
inserting a control tube through the rotor mast;
rotating the first rotor blade to a crosshead installation orientation, wherein a pin that extends from the root of the first rotor blade is located above a first pitch-change axis of the first rotor blade;
rotating the second rotor blade to a crosshead installation orientation, wherein a pin that extends from the root of the second rotor blade is located above a second pitch-change axis of the second rotor blade;
inserting a unitary crosshead through the access port;
positioning the crosshead on the control tube at a pin engagement position.

14. The method of claim 13, further comprising:
rotating the first rotor blade about the first pitch-change axis from the crosshead installation orientation into an engagement orientation, wherein the pin extending from the root of the first rotor blade is positioned within a first slot on the crosshead; and
rotating the second rotor blade about the second pitch-change axis from the crosshead installation orientation into an engagement orientation, wherein the pin extending from the root of the second rotor blade is positioned within a second slot on the crosshead.

15. The method of claim 14, further comprising:
lowering the crosshead from the pin engagement position to an operating position, wherein the lowering the crosshead causes the first and second rotor blades to rotate about the first and second pitch-change axes, respectively; and
coupling the crosshead to the control tube.

16. The method of claim 15, further comprising:
inserting a first roller element retainer through the access port of the rotor hub;
coupling the first roller element retainer to the inner race of the first thrust bearing;
inserting a second roller element retainer through the access port of the rotor hub; and
coupling the second roller element retainer to the inner race of the second thrust bearing.

17. The method of claim 16, further comprising:
coupling a first rotor blade retainer to the first rotor blade adjacent to the first hub arm; and
coupling a second rotor blade retainer to the second rotor blade adjacent to the second hub arm.

18. The method of claim 17, further comprising:
coupling a fairing to the rotor hub, wherein the fairing covers the access port.

19. The method of claim 13, further comprising:
inserting a third rotor blade into a third hub arm of the rotor hub past an operating position to a bearing installation position;
introducing a third plurality of roller elements through the access port in the rotor hub;
positioning the third plurality of roller elements around a circumference of an inner race of a third thrust bearing on a root of the third rotor blade;
withdrawing the third rotor blade to the operating position;
inserting a fourth rotor blade into a fourth hub arm of the rotor hub past an operating position to a bearing installation position;
introducing a fourth plurality of roller elements through the access port in the rotor hub;
positioning the fourth plurality of bearings around a circumference of an inner race of a fourth thrust bearing on a root of the fourth rotor blade; and
withdrawing the fourth rotor blade to the operating position.

* * * * *